(No Model.)
A. LANG.
COTTON SEED PLANTER.
No. 483,655. Patented Oct. 4, 1892.
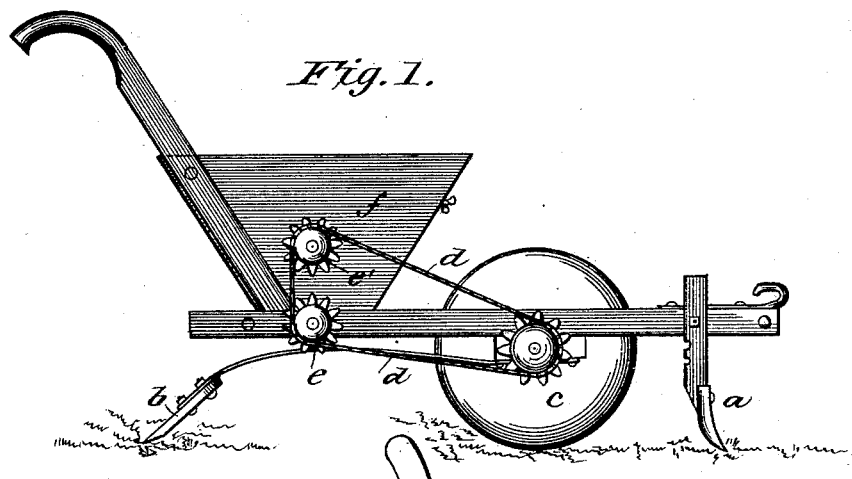
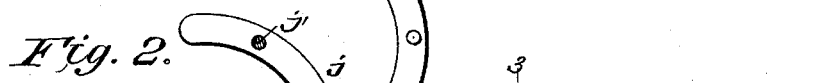
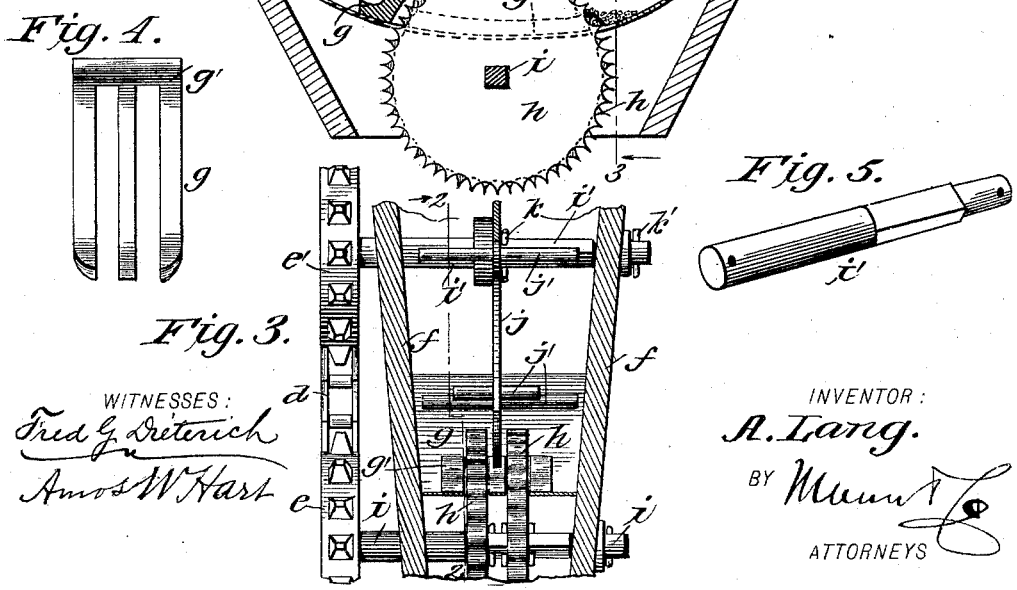
WITNESSES:
Fred G. Dieterich
Amos W. Hart
INVENTOR:
A. Lang.
BY Munn
ATTORNEYS

UNITED STATES PATENT OFFICE.

ALOIS LANG, OF MACON, GEORGIA.

COTTON-SEED PLANTER.

SPECIFICATION forming part of Letters Patent No. 483,655, dated October 4, 1892.

Application filed December 15, 1891. Serial No. 415,139. (No model.)

*To all whom it may concern:*

Be it known that I, ALOIS LANG, residing at Macon, Bibb county, in the State of Georgia, have invented a new and useful Improvement in Cotton-Seed Planters, of which the following is a specification.

My invention is an improvement in that class of planters or fertilizer-distributers in which revolving wheels or disks having a notched periphery are employed for discharging the seed or fertilizer from the hopper.

My improvements consist in features hereinafter described and claimed.

In the accompanying drawings, Figure 1 is a side view of my machine. Fig. 2 is a longitudinal section on line 2 2 of Fig. 3. Fig. 3 is a vertical cross-section on line 3 3 of Fig. 2. Fig. 4 is a plan view of the slotted bottom plate of the hopper. Fig. 5 is a perspective view of one of the shafts on which the revolving disks and seed-agitator are mounted.

As shown in Fig. 1, the machine is provided with a furrow-opener $a$, a seed-coverer $b$, and a wheel $c$, that travels behind said furrow-opener and communicates a rotary movement to the seed agitating and discharging mechanism by means of a chain $d$ and sprocket-wheels $e\ e'$. No novelty is claimed for any of these parts. The bottom of the hopper $f$ is formed of a metal plate $g$, having two straight parallel-lengthwise slots, in which the upper portions of the seed-discharging wheels or disks $h\ h$ work, as shown best in Fig. 2, the disks being mounted on a shaft $i$, arranged transversely directly beneath the bottom plate $g$. The sprocket-wheel $e$ is keyed on one end of this shaft. Directly above and parallel to the latter is a similar shaft $i'$, that passes through the hopper sides and carries the seed-agitator $j$ and the sprocket-wheel $e'$. Each of these shafts $i\ i$, Fig. 5, is cylindrical at each end, but has intermediately a fixed collar and a squared portion, (see Fig. 5,) on which the disks $h$ and seed-agitator $j$ are mounted loosely and secured in place by a spring cotter-pin $k$. This shaft has a cylindrical section adjacent to the collar, a squared section adjacent to the cylindrical one and whose greatest diameter may be inscribed within it, and a cylindrical extremity whose diameter may be inscribed within the squared section. A cotter-pin $k'$ passes through the ends of the shafts outside the hopper $f$ and secures them in their bearings. This manner of constructing and securing the shafts, disks, and agitator enables the shafts to be quickly removed from their bearings and the disks and agitator from the shafts. Thus disks suitable for discharge of corn or guano may be easily substituted for those shown. The teeth of the disks $h\ h$ are straight-edged and of the full transverse width of the body of the disks. The interdental portions of the latter are curved, as shown, thus forming transverse semicircular grooves that serve as pockets for receiving the seed and carrying it down through the slots of the hopper bottom $g$. It will be noted that the teeth of one disk are not opposite those of the other, but opposite the grooves or notches of the same, by which arrangement the seed is discharged in a broad and practically-continuous stream instead of intermittingly, as would otherwise be the case. In other words, the seed is distributed evenly in the furrows instead of being collected in spots, and comes up in a continuous row of plants rather than in bunches, which often crack the ground-crust, and thereby expose the roots of the young plants, so that they die.

On the iron bottom of the hopper is fixed a thick plate $g$, Fig. 4, having two parallel longitudinal slots, in which the disks $h$ work. The sides of the slots are as close to the disks $h$ as practicable, so that no seed can escape between the adjacent surfaces. The rear end $g'$ of said plate projects upward and forward, so as to cover a portion of the disks $h\ h$ and prevent seed or guano passing downward at that point. This part $g'$ is therefore in effect a seed-guard or baffle-plate. The vertical sides of the bottom plate $g$ have at their front ends curved inclines coinciding with the periphery of the feed-disks $h\ h$, the purpose of said inclines being to prevent the shearing of the seeds by the rotating motion of the disks, since the inclined surfaces will allow the seed to slide downward and away from the shearing edges of the disks without suffering injury or being caught by them.

In planting cotton-seed it is necessary to use an agitator. My device $j$ for this purpose is a rimless wheel—that is to say, a hub having radial arms carrying at their outer ends short rods $j'$, which are alternately of unequal length and arranged parallel to the shaft $i'$. It has been demonstrated that rods of equal length very soon gather the cotton-seed into a roll, whereas rods of unequal length stir the mass of seeds at different points and separate them, so that they feed well to the disks $h$ and discharge properly from the hopper. Further, as the agitator $j$ revolves the rods $j'$ come as near the periphery of the disks $h$ as practicable, and thus aid effectually in crushing any lumps or bunches into which the seed may have formed. It will be seen, Figs. 2 and 3, that the ends of the agitator-arms project beyond the rods $j'$, so as to work in the space between the disks $h\,h$, and thereby prevent seed packing therein.

Having thus described my invention, what I claim, and desire to secure by Letters Patent, is—

1. In a machine of the character described, the combination, with the hopper and a detachable wheel, of a shaft $i$, having the integral collar, a cylindrical section, an adjacent squared section whose greatest diameter is inscribed within that of the cylindrical portion, and a cylindrical extremity adjacent to the squared portion, the said shaft $i$ arranged transversely and having its bearings in the hopper, as shown and described.

2. In a machine of the character described, the combination, with the seed-hopper, of the revoluble seed-agitating wheel having a series of radial arms provided with transverse rods which are of alternately-unequal length, as shown and described.

ALOIS LANG.

Witnesses:
MALLORY H. TAYLOR,
MATT R. FREEMAN.